Nov. 9, 1971  V. B. HODSHIRE  3,618,251
FISH CATCHING INSTRUMENTALITY
Filed Nov. 13, 1969  2 Sheets-Sheet 1
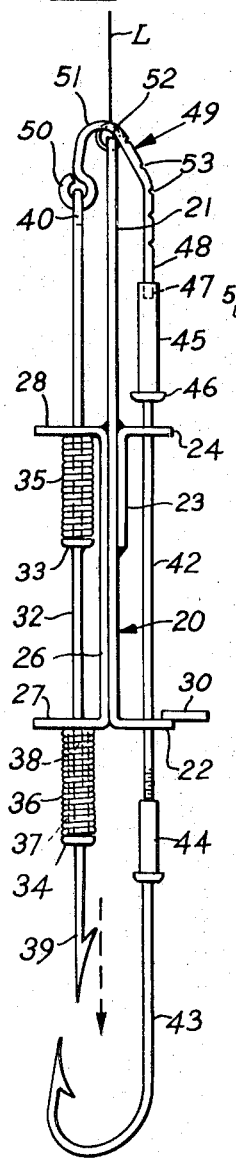
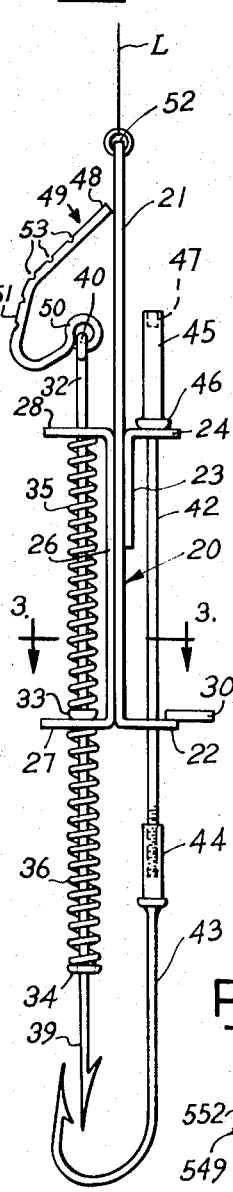
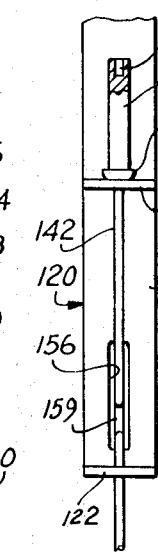
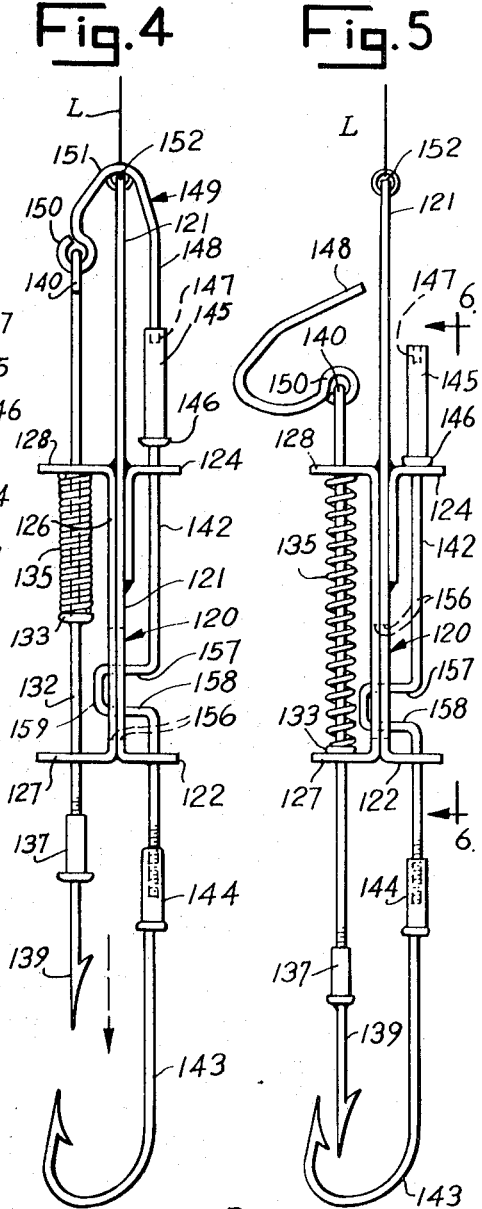
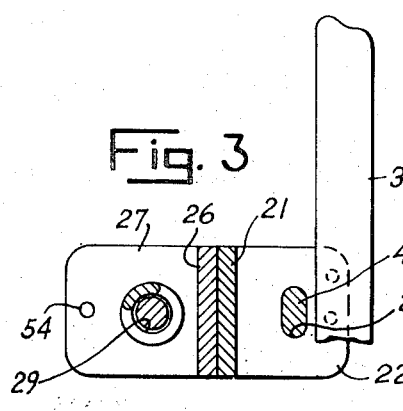
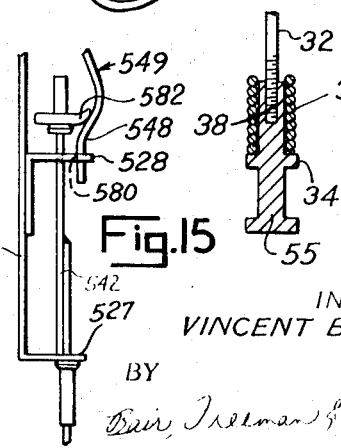
INVENTOR.
VINCENT B. HODSHIRE
BY
ATTORNEYS

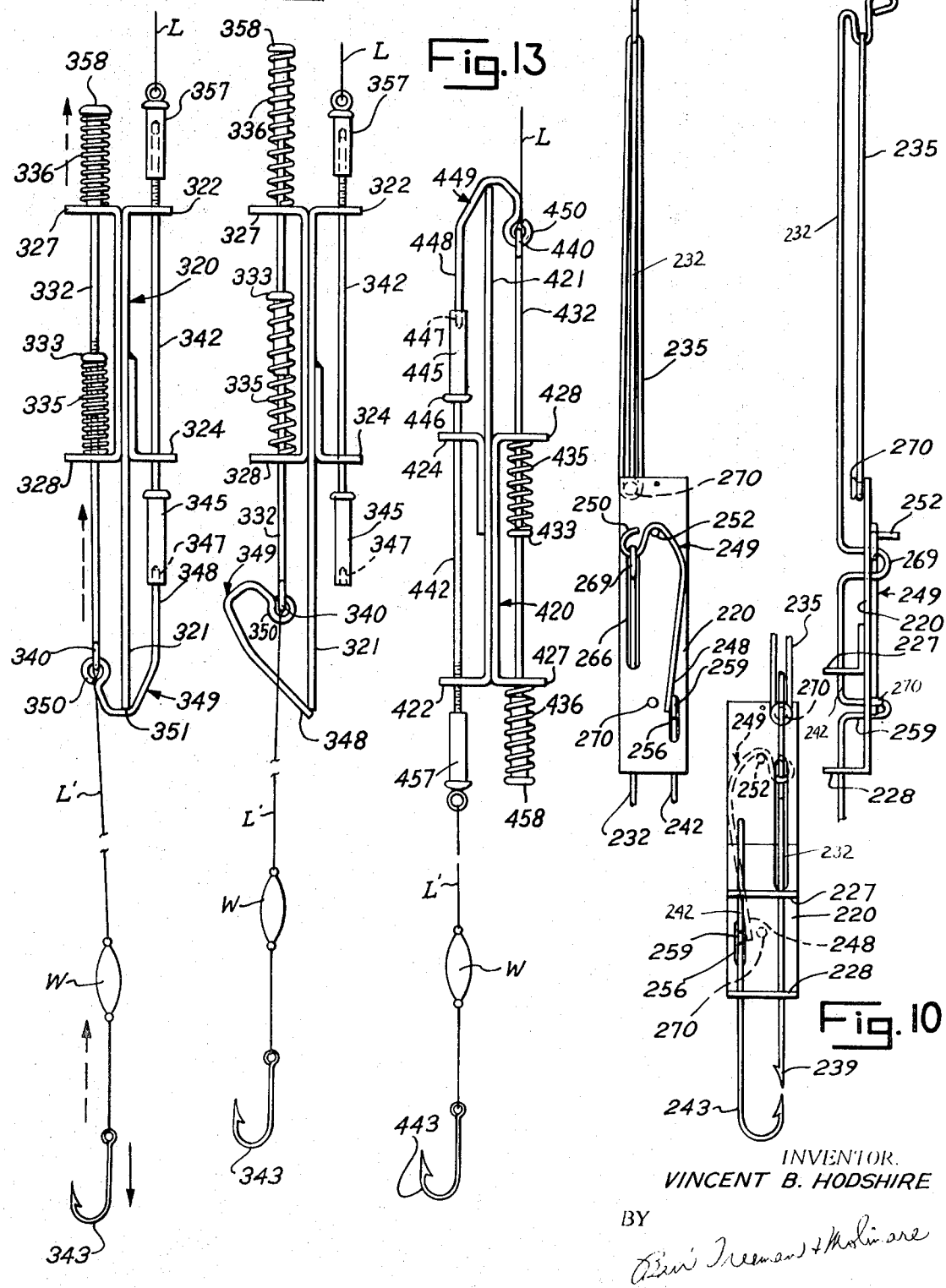

United States Patent Office 3,618,251
Patented Nov. 9, 1971

3,618,251
FISH CATCHING INSTRUMENTALITY
Vincent B. Hodshire, 2701 NE. Adams St.,
Peoria, Ill. 61603
Filed Nov. 13, 1969, Ser. No. 876,330
Int. Cl. A01k 83/00
U.S. Cl. 43—15          13 Claims

ABSTRACT OF THE DISCLOSURE

A fish catching instrumentality including a novel releasable retaining mechanism for releasing a movable fish engaging member in response to a fish biting bait on a fishhook including a frame and a trigger member that releasably engages a free-floating lever fulcrumed on the frame surface and loosely pivotally connected at an end to the fish engaging member. In one form of the invention, the fish engaging member is a spear and the fishhook is secured on the trigger member, so that when a fish bites, the free-floating lever is disengaged from the trigger member and resilient means drives the spear into the fish. In another form, the fishhook is associated with the fish engaging member and when the fish bites, the free-floating lever is disengaged from the trigger member, and resilient means biases the fish engaging member upwardly to sink the fishhook into the fish. A third form includes a free-floating lever loosely pivotally engaged at one end to the fish engaging member, with the other end engageable with a detent on the frame and releasable therefrom upon movement of the trigger member.

BACKGROUND OF THE INVENTION

This invention relates to a fish catching instrumentality.

Heretofore, those skilled in the art have struggled for many years to provide a fish catching instrumentality that would effectively preclude a fish from escaping once he nibbles upon the bait. Prior art attempts are typified by those disclosed in Wenger Pat. No. 611,400, Sweet Pat. No. 1,072,672, Partello Pat. No. 1,399,648, Sprangel Pat. No. 1,604,725, Thompson Pat. No. 2,260,923, Penninger Pat. No. 2,619,759, Gardner Pat. No. 2,640,291, Loomis Pat. No. 2,795,074 and Zalonis Pat. No. 2,889,656. The prior art structures have not met with wide commercial success primarily because the mechanisms are relatively complex, rendering the structures difficult and costly to manufacture and maintain. Furthermore, prior art structures that have included a movable fish engaging member have not been provided with adequate trigger mechanisms that would function properly when submerged, to allow the movable fish engaging member to consistently and effectively perform its function. These devices are not as sensitive to the pull of the fish as is desired.

Consider, for example, Wenger Pat. No. 611,400, wherein a frame carries a hook and a spear. A lever, which is pivoted on the frame and on the hook by fixed pivots, is adapted to engage with and be retained beneath an abutment shoulder on an end of the spear to hold the spear in retracted position against a spring disposed within a housing between the frame and lever. The fish nibbling at the bait on the hook draws the hook downward with respect to the frame and such movement of the hook acts against the force at the pivot point between the lever and the frame and the force between the lever and abutment shoulder on the spear. Sensitivity of release is somewhat impaired. It is, therefore, desired to improve the sensitivity of a fish catching device by minimizing reaction forces between pivots and interacting components.

BRIEF SUMMARY OF THE INVENTION

An object of this invention is to provide a fish catching instrumentality that is relatively simple in construction and functions in an effective manner with improved sensitivity as compared to known prior art devices. Other objects and advantages of this invention will be made apparent in the description which follows.

The fish catching instrumentality of the present invention includes a frame having a movable fish engaging member thereon that is releasably retained in a cocked position by a novel releasable retaining mechanism. The fish catching instrumentality has on its frame first and second guide means, with the fish engaging member being mounted for movement in the first guide means, and with a trigger member being mounted for movement in the second guide means. A free-floating release lever is loosely pivotally connected at one end to the fish engaging member, and the other end of the free-floating lever is releasably engageable with the trigger member when the trigger member is in a set position to releasably retain the fish engaging member in a cocked position. The fish catching instrumentality is arranged such that when a fish bites upon bait carried by a fishhook associated with the instrumentality, the free-floating lever is released from the trigger member, to allow the fish engaging member to move to a released position under the bias of an urging means. In one form of the invention, the fishhook is carried by the end of the trigger member opposite from the portion engaging with release lever, and the fish engaging member includes a spear positioned adjacent the fishhook, so that when the fish engaging member moves to the released position, the spear is driven into the fish. In another form of the invention, the fishhook is associated with the fish engaging member, so that when the fish engaging member moves to the released position, the fishhook is jerked upwardly into engagement with the fish. In yet another embodiment, the free end of the free-floating lever is latched on the frame and released upon movement of the trigger member relative to the frame.

BRIEF DESCRIPTION OF THE DRAWINGS

There is illustrated in the drawing presently preferred forms of the invention, wherein:

FIG. 1 is a side elevational view of a first embodiment of the invention, with the fish engaging member being illustrated in the cocked position;

FIG. 2 is a side elevational view similar to FIG. 1, and showing the fish engaging member in the released position;

FIG. 3 is a fragmentary sectional view taken generally along lines 3—3 of FIG. 2;

FIG. 4 is a view similar to FIG. 1, but illustrating a second embodiment of the invention with the fish engaging member in the cocked position;

FIG. 5 is a side elevational view of the embodiment of FIG. 4 illustrating the fish engaging member in the released position;

FIG. 6 is a fragmentary front elevational view of the structure illustrated in FIGS. 4 and 5, and illustrates the guide means for the trigger member;

FIG. 7 is a sectional view through the end portion of a modification of the fish engaging member;

FIG. 8 is a fragmentary rear elevational view of a modified fish catching instrumentality;

FIG. 9 is a side elevational view of the instrumentality of FIG. 8;

FIG. 10 is a front elevational view of the instrumentality of FIG. 8;

FIG. 11 is a side elevational view similar to FIGS. 1, 4 and 9, and illustrating a further embodiment of the invention with the fish engaging member in the cocked position;

FIG. 12 is a view similar to FIGS. 2 and 5, and illustrates the embodiment of FIG. 11 with the fish engaging member in the released position;

FIG. 13 is a side elevational view similar to FIGS. 1, 4 and, 11 and illustrating yet another embodiment of the invention.

FIG. 14 is a front elevational view of a further embodiment of the invention;

FIG. 15 is a fragmentary side elevational view of the embodiment of FIG. 14.

DESCRIPTION OF THE PREFERRED EMBODIMENTS

Referring now to the drawings in detail, the fish catching instrumentality illustrated in FIGS. 1–3 is in the form of a fish trap which includes a frame 20 that is illustrated as including a vertically-extending first member 21 having a horizontally-extending portion 22 at the lower end thereof. The frame 20 includes a second member that is welded, or otherwise suitably secured, to the first member, and the second member includes a vertically-disposed portion 23 and a horizontally-disposed portion 24 positioned in spaced parallel relationship with frame portion 22. As can be best seen in FIG. 3, frame portions 22 and 24 include non-circular openings 25 that are positioned in alignment with one another to define a guide means for a trigger member to be hereafter described. The frame 20 includes a third generally U-shaped member having a bight portion 26 that is secured to the side of the first frame member opposite from frame portions 22 and 24, with the third frame member including spaced, parallel horizontally-extending legs or frame portions 27 and 28 at opposite ends thereof that are positioned in transverse alignment with frame portions 22 and 24, respectively. Frame portions 27 and 28 include aligned openings 29 (FIG. 3) that define a guide means for a fish engaging member to be hereafter described. A stabilizing member 30, the function of which will be described in detail hereinafter, may be secured to frame portion 22 outwardly of the opening 25 therein. Frame member 30 extends laterally outwardly an equal amount from the opposite sides of frame portion 22, with approximately half of the stabilizing member 30 being illustrated in FIG. 3.

A fish engaging member 32 is slidably mounted within the guide means defined by the openings 29 in frame portions 27 and 28, and fish engaging member 32 includes spaced abutments 33 and 34 defining spring seats. A first spring 35 is biased between spring seat 33 and frame portion 28, and a second spring 36 is biased between spring seat 34 and frame portion 27, with the springs 35 and 36 being tightly compressed in the cocked position of FIG. 1. The springs 35 and 36 comprise resilient means for urging the fish engaging member toward a released position. In the embodiment of FIGS. 1–3, spring seat 34 is provided as a portion of a sleeve 37 having an internally-threaded opening 38 at the upper end thereof that makes a threaded connection with an externally-threaded portion at the lower end of the fish engaging member 32. The lower end of the sleeve 37 carries a spear 39 to be driven into a fish when the member 32 moves from the cocked position (FIG. 1) to the released position (FIG. 2), as will hereinafter be explained. The upper end of member 32 is bent to form a hook-like eyelet 40 for connecting the member 32 to a trigger mechanism for releasing the member 32 for movement from the cocked position of FIG. 1 to the released position of FIG. 2.

A trigger member 42 is slidably mounted in the guide means defined by openings 25 in frame portions 22 and 24. In the embodiment of FIGS. 1 and 2, a fishhook 43 is secured to the lower end of trigger member 42, as by an internally-threaded sleeve 44 at the upper end of the fishhook making a threaded connection with an externally-threaded portion at the lower end of the trigger member 42. As is evident from FIG. 3, the shank portion of the trigger member 42 is noncircular in cross-section and is complementary in cross-section to the opening 25, so that the fishhook 43 is retained in proper orientation with respect to the spear 39. The fishhook 43 and spear 39 are offset somewhat so that in released position, the spear 39 will not engage the hook 43 and will pass below the end of the hook as shown in FIG. 2. A further sleeve 45 is fixed to the upper end of trigger member 42, and sleeve 45 includes a stop 46 thereon adapted to engage frame portion 24 when the trigger member 42 is moved from the set position of FIG. 1 to the tripped position of FIG. 2. Sleeve 45 includes an upwardly-facing opening 47 in the upper end thereof, and opening 47 forms the female portion of a male and female connection means for releasably retaining the trigger member 42 in the set position.

The male portion of the male and female connection means is defined by the end portion 48 of a free-floating release lever 49. The end portion 48 of lever 49 is slidably insertable within opening 47. The end of lever 49 opposite from end portion 48 includes a hook-like eyelet portion 50 that makes a pivotal connection with the end portion 40 of the fish engaging member 32, and the intermediate portion 51 of the lever 49 is adapted to bear against a fulcrum or bearing surface defined at the upper end 52 of the frame member 21 when the member 32 is moved into the cocked position and the trigger member 42 is in the set position. While the eyelet portion 50 is illustrated as being perpendicular with frame portion 21, the orientation of eyelet portions 40 and 50 can be reversed, with eyelet portion 40 being perpendicular with frame portion 21 and with eyelet portion 50 being disposed parallel with respect thereto. Preferably, the free-floating lever 49 is disposed so that the effective arm between the eyelet portion 50 and fulcrum 52 is less than the effective arm between the fulcrum 52 and the end of portion 48 that engages with the upper end of the trigger member 42. This arrangement increases release sensitivity since the fish engaging member will be free for movement as soon as the free end of the free-floating level 49 is released from engagement with the end of the trigger member.

In use, the trigger member 42 is moved upwardly from the position of FIG. 2 to the position of FIG. 1 to lift the stop 46 from frame portion 24 and to position the opening 47 in sleeve 45 to receive the end 48 of lever 49. The lever 49 is then positioned over the fulcrum 52 of the frame member 21, with the intermediate portion 51 of the lever 49 bearing against the fulcrum 52 on the upper end of member 21. As the lever 49 is pivoted about the eyelet 40 at the upper end of the member 32, the upper surface 52 of member 21 acts as a fulcrum so that the member 32 is lifted from the released position of FIG. 2 to the cocked position of FIG. 1. The lever 49 may be provided with notches 53 to facilitate manipulation thereof. The lever 49 will effectively hold the member 32 against movement once the end portion 48 of the lever is inserted into the opening 47. When a fish bites the bait (not shown) on hook 43, the trigger member 42 is moved downwardly from the set position of FIG. 1 to the tripped position of FIG. 2 to disengage the end portion 48 of lever 49 from the opening 47 in sleeve 45. Since the lever 49 is freely pivoted to the upper end of the fish engaging member 32, once the male and female connection means is disengaged, the springs 35 and 36 will drive the fish engaging member downwardly so that the spear 39 thereon will be driven into the head of the fish. Spring seat 33 provides a stop to limit the downward movement of the fish engaging member. The engagement of the upper surface 52 of the frame member 21 with the intermediate portion 51 of the lever 49 will pivot the lever 49 relative to the frame 20 as the spear moves downwardly to the released position.

In the embodiment of FIGS. 1–3, the fisherman's line L is illustrated as being connected to the upper end of frame member 21. If it is desired to use the trap of the present invention in bottom fishing, the fisherman's line L may be connected to an opening 54 (FIG. 3) in the frame portion 27. In this instance, the weighted stabilizing member 30 will rest upon the bottom and retain the fishhook 43 at right angles to the stabilizing member and the bottom of the pond or lake, in the proper disposition to be accessible to a fish.

In certain instances, it is desirable to eliminate the spear 39, and in those instances, the sleeve 37 can be unthreaded from the end of the member 32 and replaced with a bumper 55 illustrated in FIG. 7. When the bumper 55 is used in place of spear 39, it cooperates with the fishhook 43 to force the hook up and into the head of the fish, when the member 32 moves from the cocked position of FIG. 1 to the released position of FIG. 2.

Preferably, the fish catching instrumentality is made from metal that is not readily subject to corrosion due to water. The frame may be made from separate members or from a unitary member having projections struck therefrom to define the guide means for the fish engaging member and the trigger member.

Turning now to the embodiment of FIGS. 4–6, certain elements therein are essentially the same as those illustrated in the previously described embodiment, and reference numerals in the 100 series have been used to designate those elements that correspond to elements in th previously described embodiment. The embodiment of FIGS. 4–6 differs essentially from the previously described embodiment in the use of a different structure for retaining the trigger member 142 against rotation relative to the member 132, to ensure the proper cooperative relationship between the hook 143 and the spear 139. While in the embodiment of FIGS. 1–3, the cooperative relationship between the non-circular openings 25 and the complementarily-shaped shank of member 42 were relied upon to perform this function, in the embodiment of FIGS. 4–6, member 142 is essentially circular in cross-section. In the embodiment of FIGS. 4–6, aligned slots 156 are provided in frame portions 121 and 126. Trigger member 142 includes inwardly-extending portions 157 and 158 that are connected by a vertically-extending portion 159; and as is evident from FIGS. 4 and 5, portions 157 and 158 extending through slots 156 with the edges of the slots cooperating to guide the trigger member in its movement between the set position of FIG. 4 and the tripped position of FIG. 5.

Another embodiment of the invention is illustrated in FIGS. 8–10. In this form, the frame 220 includes frame portions 227 and 228 having openings therein, which openings define separate guide means for the fish engaging member 232 and the trigger member 242, respectively. The fish engaging member 232 and trigger member 242 each include intermediate bent portions or bight portions 269 and 259, respectively, which engage in slots 266 and 256, respectively, in frame 220.

Free-floating lever 249 has an eyelet 250 at one end which loosely pivotally connects with the bent portion 269 on fish engaging member 232. The intermediate portion of the lever 249 engages on fulcrum 252 on frame 220, which is defined by the outer surface of a pin or like member extending outwardly from one side of the frame member opposite from the side of the frame from which frame portions 227 and 228 extend. The free end of the lever 249 is adapted to engage with and be releasably retained by the bent portion 259 on the trigger mechanism. It is noted that the lever 249 pivots on fulcrum 252 relatively closely adjacent the eyelet 250 to increase the mechanical advantage and facilitate cocking of the fish engaging member. Also, sensitivity of release is enhanced, since the fish engaging member 232 is freed for movement as soon as the free end of lever 249 is released from engagement with the trigger mechanism.

The resilient means for urging the fish engaging member 232 to released position comprises resilient bands 235 made from rubber or like material and engaged between an end of the fish engaging member 232 and a projection 270 on the frame 220.

The operation of the fish catching instrumentality of FIGS. 8–10 is essentially the same as that for the prior embodiments described. When a fish bites the bait (not shown) on hook 243, the trigger member 242 is moved downwardly to release the bent portion 259 from the end of lever 249. The lever 249 is loosely pivoted on the bent portion 269 on the fish engaging member 232 and thus readily pivots thereon away from the fulcrum 252, releasing the fish engaging member 232 and permitting resilient means 235 to drive the spear 239 on the fish engaging member 232 into the head of a fish. Downward movement of the fish engaging member 232 is limited by engagement of the bent portion 269 with the bottom of slot or opening 266 in the frame 220.

Safety pin 270 extends outwardly from frame 220. The lever 249 is engaged with the safety pin 270 while bait is being placed on the hook secured to the trigger mechanism 242 so as to prevent inadvertent release of the spear or fish engaging member 232. After the hook has been properly baited, the free end 248 of the lever 249 is freed manually from the safety pin 270 and positioned for releasable engagement against the bent portion or abutment portion 259 on trigger member or trigger mechanism 242.

The free end of the free-floating lever 249 is adapted to engage with the bent portion 259 on trigger member 242. Other configurations of the free end of lever 249 are permissible within the broader aspects of this invention, provided that desired release of the free-floating lever from engagement with the trigger member is obtained. For example, the trigger member 242 may be provided with a loop and the free end of the free-floating lever will engage within the loop and be released after predetermined movement of the trigger member in its guide means relative to the frame.

The embodiments of FIGS. 11–13 differ essentially from the previously described embodiments, in that the previously described embodiments include a mechanism for driving a spear or the like downwardly toward a fish, whereas the embodiments of FIGS. 11–13 includes a mechanism for jerking a fishhook upwardly to set or sink the fishhook into the fish as it pulls on the hook. In the embodiment of FIGS. 11 and 12, a mechanism is utilized that is similar to that of the previously described embodiments, except that the mechanism is inverted when used as a jerking device. Common reference numerals have been used in connection with the embodiment of FIGS. 11 and 12 to designate elements that correspond with elements of the previously-described embodiments, and reference numerals in the 300 series are usd in connection with the embodiment of FIGS. 11 and 12.

In the embodiment of FIGS. 11 and 12 an adapater 357 is used in lieu of a fishhook. The adapter 357 may be threaded upon the end portion of member 342 and connected to a fisherman's line by a hook or loop at the upper end thereof. An adapter 358 is used in lieu of the spear 39 or 139, and the adapter 358 may be threaded upon the end portion of member 332. The adapter 358 includes an enlarged end portion that provides a seat for spring 336. A fishhook 343 is connected to eyelet 340 at the end of member 332 opposite from adapter 358, and a weight W of lead or the like, may be provided in line L' above the hook 343.

In use, when a fish bites the bait (not shown) on hook 343, the resistance of springs 335 and 336 causes the frame 320 to be moved downwardly, and the engagement of frame portion 351 with free-floating lever 349 withdraws the end portion 348 of the lever 349 from the opening 347 in sleeev 345. Once the lever 349 is disconnected from the trigger member 342, the springs 335 and 336 drive the member 332 upwardly, which causes the hook 343 to be sunk into the head of a fish. The embodiment illustrated in FIGS. 11 and 12 does not have to be totally immersed in water, if desired, so long as the weight W is sufficient to keep the hook 343 below the surface of the water.

The embodiment of FIG. 13 is similar to the embodiment of FIGS. 11 and 12, in that it discloses an arrangement for jerking a fishhook upwardly to sink the hook into a fish. The mechanism of FIG. 13 is similar to that of that of the previously described embodiments, so that reference numerals in the 400 series have been used to designate those elements which correspond to common elements in the previously described embodiments. The embodiment of FIG. 13 differs essentially from the embodiment of FIGS. 11 and 12 in that the mechanism is positioned in an upright disposition, similar to that illustrated in FIGS. 1, 2, 4 and 5.

In use, the fisherman's line is connected to the eyelet 440 on member 432 and a further line L' is connected to the adapter 457 on member 442. When a fish bites upon the bait on hook 443, member 442 is moved downwardly to free the end 448 of lever 449 from the opening 447 in sleeve 445. As member 442 is moved downwardly, springs 435 and 436 force the frame 420 upwardly, so that when frame portion 424 engages the spring seat 446 on sleeve 445, the fishhook 443 is jerked upwardly to sink the hook into the head of a fish.

The embodiment of FIGS. 14 and 15 includes a free-floating lever 549 which is pivoted loosely at one end on the fish engaging member 532 and which has the free end thereof retained in a modified manner. The intermediate portion of the lever 549 cooperates with fulcrum pin 552 extending outwardly from frame 520 and the free end portion 548 of lever 549 engages in the latch 580 formed by a notch in the frame portion 528. Fixedly carried on the trigger mechanism 542 is a wedge or cam 582, which is adapated to engage with the free end portion 548 of the lever 549 and release same from engagement with the latch 580 upon downward movement of the trigger member 542 relative to the frame 520.

The fish engaging member 532 and the trigger member 542 are guided for reciprocal movement by guide means defined in the frame portion 528 and 527, respectively, on frame 520. Such guide means may take the form of non-circular openings in the frame portions, with the fish engaging member 532 and the trigger member 542 being of complementary non-circular cross-section to prevent undersirable rotation of the fish engaging member 532 and trigger member 542 about their axes.

In other respects, this embodiment of the invention functions like the embodiments of FIGS. 1-3 and 4-6, respectively.

While presently preferred forms of the present invention have been described for purposes of illustration, it will be appreciated that this invention may be otherwise embodied within the scope of the following claims.

I claim:

1. A fish catching instrumentality comprising: a frame having first and second guide means thereon; means on said frame defining a bearing surface that functions as a fulcrum; a fish engaging member mounted for movement in said first guide means between a cocked position and a released position; means urging said fish engaging member toward said released position; and means for releasably retaining said fish engaging member in the cocked position including a free-floating lever connected to said fish engaging member and having an intermidate portion engaging said fulcrum, a trigger member mounted for movement in said second guide means between a set position and a tripped position, and releasable means for connecting said trigger member to said lever when said trigger member is in said set position, said intermediate portion of said lever being engageable with said fulcrum for moving said fish engaging member to the cocked position whereby when said releasable means and said lever re disengaged, from each other by a pull of a fish, said urging means moves said fish engaging member from said cocked position to said released position, and said trigger member is moved from the set to the tripped position.

2. A fish catching instrumentality as set forth in claim 1 in which said fulcrum is defined by an abutment surface on said frame that is engaged by said intermediate portion of said lever when said fish engaging member is in the cocked position and said trigger member is in the set position, the effective arm between the fish engaging member and the fulcrum being less than the effective arm between the fulcrum and the trigger member.

3. A fish catching instrumentality as set forth in claim 1 in which said trigger member has a non-circular cross section, and wherein said second guide means includes spaced portions of said frame having aligned non-circular openings slidably receiving said trigger member.

4. A fish catching instrumentality as set forth in claim 1 in which said trigger member has an offset portion, and wherein said second guide means includes a slot in said frame slidably receiving said offset portion for preventing rotation of said trigger member about its axis.

5. A fish catching instrumentality as set forth in claim 1 in which said releasable means is defined by slidably interengageable male and female members including a sleeve at one end of said trigger member that forms the female portion of said releasable means and an end portion of said lever that is slidably insertable in said sleeve to form the male portion of said releasable means.

6. A fish catching instrumentality as set forth in claim 1 in which said urging means is defined by at least one spring that is biased between a stop on the frame and an abutment on the fish engaging member.

7. A fish catching instrumentality as set forth in claim 1 including stabilizing means on the frame and extending outwardly therefrom for retaining the instrumentality in an appropriate disposition.

8. A fish catching instrumentality as set forth in claim 1 in which said trigger member has a fishhook thereon positioned adjacent the fish engaging member.

9. A fish catching instrumentality as set forth in claim 8 in which said fish engaging member includes a spear at one end thereof adjacent said fishhook, so that when said releasable means is disengaged, the urging means moves the fish engaging member to the released position to drive the spear into the fish.

10. A fish catching instrumentality as set forth in claim 1 in which said urging means urges said fish engaging member upwardly, and wherein a fishhook is connected to said fish engaging member, so that when said connecting means is released, the fish engaging member is jerked upwardly to sink the hook into a fish.

11. In a fish catching instrumentality including a frame; a fish engaging member slidably mounted on the frame for movement between a cocked position and a released position; resilient means urging said fish engaging member toward said released position; and retaining means for releasably retaining said fish engaging member in the cocked position including a trigger member slidably mounted on the frame for movement between a set position and a tripped position, characterized by the frame having a fulcrum thereon, said retaining means including a free-floating lever pivotally ocnnected loosely to the fish engaging member adjacent one end portion thereof and said lever having an intermediate portion engageable with the fulcrum on the frame and movable from engagement therewith, the free end portion of said lever cooperating with the trigger member and being adapted to be released thereby, whereby when said lever is freed, the urging means moves the fish engaging member from the cocked position to the released position.

12. A fish catching instrumentality as in claim 11 wherein the fish engaging member and the trigger member are each slidably guided on the grame for movement along substantially parallel paths on one side of the frame and said fish engaging member and said trigger member having portions extending through openings in the frame to the opposite side of the frame, said fulcrum being defined on said opposite side and extending therefrom, said lever being loosely pivotally connected at one end to said portion of said fish engaging member extending through an opening, with the other end of said lever being releasably engageable with the portion of the trigger member extending through an opening in the frame.

13. A fish catching instrumentality as in claim 11, wherein the free end portion of the lever engages a latch on the frame and said trigger member includes wedge means thereon for engaging and releasing said free end portion of said lever from said latch.

References Cited

UNITED STATES PATENTS

| | | | |
|---|---|---|---|
| 611,400 | 9/1898 | Wenger | 43—34 |
| 1,072,672 | 9/1913 | Sweet | 43—34 |
| 1,614,931 | 1/1927 | Pennell | 43—15 |
| 1,816,235 | 7/1931 | Schroeder | 43—15 |
| 2,589,533 | 3/1952 | Buchner | 43—15 |
| 2,889,656 | 6/1959 | Zalonis | 43—37 |

ALDRICH F. MEDBERY, Primary Examiner

D. J. LEACH, Assistant Examiner

U.S. Cl. X.R.

43—34